(12) United States Patent
Su et al.

(10) Patent No.: US 9,787,520 B2
(45) Date of Patent: Oct. 10, 2017

(54) SIGNAL RECEIVER WITH ADAPTIVE SOFT INFORMATION ADJUSTMENT AND ASSOCIATED SIGNAL PROCESSING METHOD

(71) Applicant: MStar Semiconductor, Inc., Hsinchu Hsien (TW)

(72) Inventors: Yu-Che Su, Zhubei (TW); Tzu-Hsuan Huang, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/990,962

(22) Filed: Jan. 8, 2016

(65) Prior Publication Data
US 2016/0204973 A1 Jul. 14, 2016

(30) Foreign Application Priority Data
Jan. 9, 2015 (TW) .............................. 104100698 A

(51) Int. Cl.
*H04L 25/06* (2006.01)
*H04L 27/38* (2006.01)

(52) U.S. Cl.
CPC ............ *H04L 27/38* (2013.01); *H04L 25/067* (2013.01)

(58) Field of Classification Search
CPC .............................. H04L 25/067; H04L 27/38
See application file for complete search history.

(56) References Cited

U.S. PATENT DOCUMENTS

| 2002/0067780 A1* | 6/2002 | Razzell | H03M 13/2792 375/341 |
| 2005/0025076 A1* | 2/2005 | Chaudhuri | H04L 1/0054 370/310 |
| 2005/0154955 A1 | 7/2005 | Cai et al. | |
| 2005/0201484 A1* | 9/2005 | Wilhelmsson | H04L 27/38 375/286 |
| 2014/0173385 A1* | 6/2014 | Li | H03M 13/1111 714/780 |

OTHER PUBLICATIONS

TIPO Office Action, Apr. 8, 2016, 7 pages.

* cited by examiner

*Primary Examiner* — David B. Lugo
(74) *Attorney, Agent, or Firm* — Edell, Shapiro & Finnan, LLC

(57) ABSTRACT

A signal receiver with adaptive software information adjustment of a communication system is provided. The signal receiver receives a modulated signal comprising a plurality of packets, and includes: a demodulating circuit, configured to demodulate the modulated signal to generate a plurality of sets of soft information corresponding to each packet; a software information adjusting circuit, coupled to the demodulating circuit, configured to adjust the sets of soft information according to a distribution of the sets of soft information corresponding to each packet; a quantizer, coupled to the soft information adjusting circuit, configured to quantize the adjusted sets of soft information to generate a plurality of sets of data; and a decoder, coupled to the quantizer, configured to decode the data.

13 Claims, 16 Drawing Sheets

| SNR | -1dB | -0.9dB | -0.8dB | -0.7dB | -0.6dB |
|---|---|---|---|---|---|
| index value l | 0.534 | 0.5287 | 0.5233 | 0.5159 | 0.5124 |
| characteristic value α | 4.8125 | 4.8192 | 4.8954 | 4.3762 | 4.4836 |

FIG. 9

| SNR | 1.9dB | 2.0dB | 2.1dB | 2.2dB | 2.3dB |
|---|---|---|---|---|---|
| index value | 0.5339 | 0.5282 | 0.5227 | 0.5136 | 0.5106 |
| characteristic value α | 4.9412 | 4.8334 | 4.8176 | 4.7234 | 4.7548 |

FIG. 10

| SNR | 11.8dB | 11.9dB | 12.0dB | 12.1dB | 12.2dB |
|---|---|---|---|---|---|
| index value l | 1.8522 | 1.8424 | 1.8345 | 1.8218 | 1.8135 |
| characteristic value α | 8.0091 | 7.6249 | 7.3565 | 7.3554 | 7.3503 |

FIG. 11

SIGNAL RECEIVER WITH ADAPTIVE SOFT INFORMATION ADJUSTMENT AND ASSOCIATED SIGNAL PROCESSING METHOD

This application claims the benefit of Taiwan application Serial No. 104100698, filed Jan. 9, 2015, the subject matter of which is incorporated herein by reference.

BACKGROUND OF THE INVENTION

Field of the Invention

The invention relates in general to a signal receiver of a communication system, and more particularly to a signal receiver with adaptive soft information adjustment and an associated signal processing method.

Description of the Related Art

FIG. 1 shows a functional block diagram of a signal receiving end of a conventional communication system. A transmission signal S transmitted from a transmitting end (not shown) is transmitted through a channel 110 (having a channel effect H) and added by noise N (represented by an adder 120) during the transmission process, and becomes an input signal Y=HS+N received at a signal receiving end 130. A channel estimating unit 131 estimates a channel effect H' that the input signal Y underwent according to the input signal Y, and an equalizer 132 restores the input signal Y according to the channel effect H' to obtain a modulated signal S'=Y/H'=(HS+N)/H'. Assuming that H' is close to H, the modulated signal S' may be approximately S'=S+N', where N' is equalized noise. A soft-decision demodulating circuit 133 demodulates the modulated signal S' to generate a plurality of sets of soft information $S_I$. FIG. 2 shows a diagram of a relationship between soft information and hard information. In hard decision, if the value of the modulated signal S' is greater than a threshold η, the modulated signal S' is determined as $S_1$, and if the value of the modulated signal S' is smaller than the threshold η, the modulated signal S' is determined as $S_0$. The threshold η is usually an average of $S_1$ and $S_0$, i.e., η=($S_0+S_1$)/2. Thus, if the modulated signal S' happens to be near the threshold η, a misjudgment is likely incurred. On the other hand, in soft decision, the modulated signal S' is determined according to a maximum a posterior (MAP) principle, and a similarity level between the modulated signal S' and $S_1$ or $S_0$ can be obtained. For example, if the modulated signal S' is located at a position indicated by y, the modulated signal S' is determined as $S_0$ as far as hard decision is concerned. As far as soft decision is concerned, the probability ($P_1$) of determining the modulated signal S' as $S_1$ is greater than the probability ($P_0$) of determining the modulated signal S' as $S_0$, and so the modulated signal S' is eventually determined as $S_1$. According to the MAP principle, soft decision has a higher reliability. However, the accuracy of soft decision is frequently affected by the channel or noise and thus becomes lowered. Therefore, soft information $S_I$ is conventionally compensated.

Again referring to FIG. 1, an output of the soft decision demodulating circuit 133 is coupled to a multiplier 134. The multiplier 134 multiplies the soft information $S_I$ by a constant coefficient A to generate adjusted soft information $S_I'$. A quantizer 135 quantizes the adjusted soft information $S_I'$ by its adjustment range to generate quantized data. The decoder 136 then decodes the quantized data to generate decoded data. However, adjusting the soft information $S_I$ by the constant coefficient A suffers from certain drawbacks. When the soft information $S_I$ is good enough (meaning that the decoded data having undergone quantization and decoding has a very low bit error rate (BER)), multiplying such soft information $S_I$ by the constant coefficient A may contrarily cause an increase in the BER. Therefore, there is a need to improve the conventional signal receiving end 130, such that the quantizer 135 may obtain more appropriate soft information to further reduce the BER of the signal receiving end 130.

SUMMARY OF THE INVENTION

It is an object of the present invention to provide a signal receiver with adaptive soft information adjustment and an associated signal processing method to reduce the BER.

The present invention discloses a signal receiver of a communication system. The signal receiver receives a modulated signal comprising a plurality of packets, and includes: a demodulating circuit, configured to demodulate the modulated signal to generate a plurality of sets of soft information corresponding to each packet; a soft information adjusting circuit, coupled to the demodulating circuit, configured to adjust the sets of soft information according to a distribution of the sets of soft information corresponding to each packet; a quantizer, coupled to the soft information adjusting circuit, configured to quantize the sets of adjusted soft information to generate a plurality of sets of data; and a decoder, coupled to the quantizer, configured to decode the sets of data.

The present invention further discloses a signal processing method applied to a signal receiver of a communication system. The signal processing method includes: demodulating a modulated signal comprising a plurality of packets to generate a plurality of sets of soft information corresponding to each packet; adjusting the sets of soft information according to a distribution of the sets of soft information corresponding to each packet; quantizing the sets of adjusted soft information to generate a plurality of sets of data; and decoding the sets of data. The signal receiver with adaptive soft information adjustment and the associated signal processing method of the present invention are capable of appropriately adjusting the soft information according to the distribution of the soft information. The adjusted soft information can be more effectively quantized by a next-stage quantizer. Thus, the final decoded data is more accurate. Compared to a conventional signal receiver of a communication system, the present invention is further capable of dynamically adjusting the soft information according to actual distribution conditions of the soft information to provide the soft information with better compensation effects. In contrast, a conventional constant coefficient for adjusting soft information is incapable of dynamic adjustment according to actual conditions of a signal. Therefore, opposite results are even sometimes obtained such that the compensated soft information further causes an increased BER.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 9 is an LUT corresponding to a BPSK modulation mechanism according to an embodiment of the present invention;

FIG. 10 is an LUT corresponding to a QPSK modulation mechanism according to an embodiment of the present invention;

FIG. 11 is an LUT corresponding to a 64QAM modulation mechanism according to an embodiment of the present invention;

DETAILED DESCRIPTION OF THE INVENTION

Technical terms of the application are based on the general definition in the technical field of the application. If the application describes or explains one or some terms, definitions of the terms are based on the description or explanation of the application.

The disclosure of the present invention includes a signal receiver with adaptive soft information adjustment and an associated signal processing method. The signal receiver with adaptive soft information adjustment and the associated signal processing method are capable of adaptively adjusting soft information according to a distribution of the soft information, and may be applied to a quadrature amplitude modulation (QAM) communication system.

Figure 1:
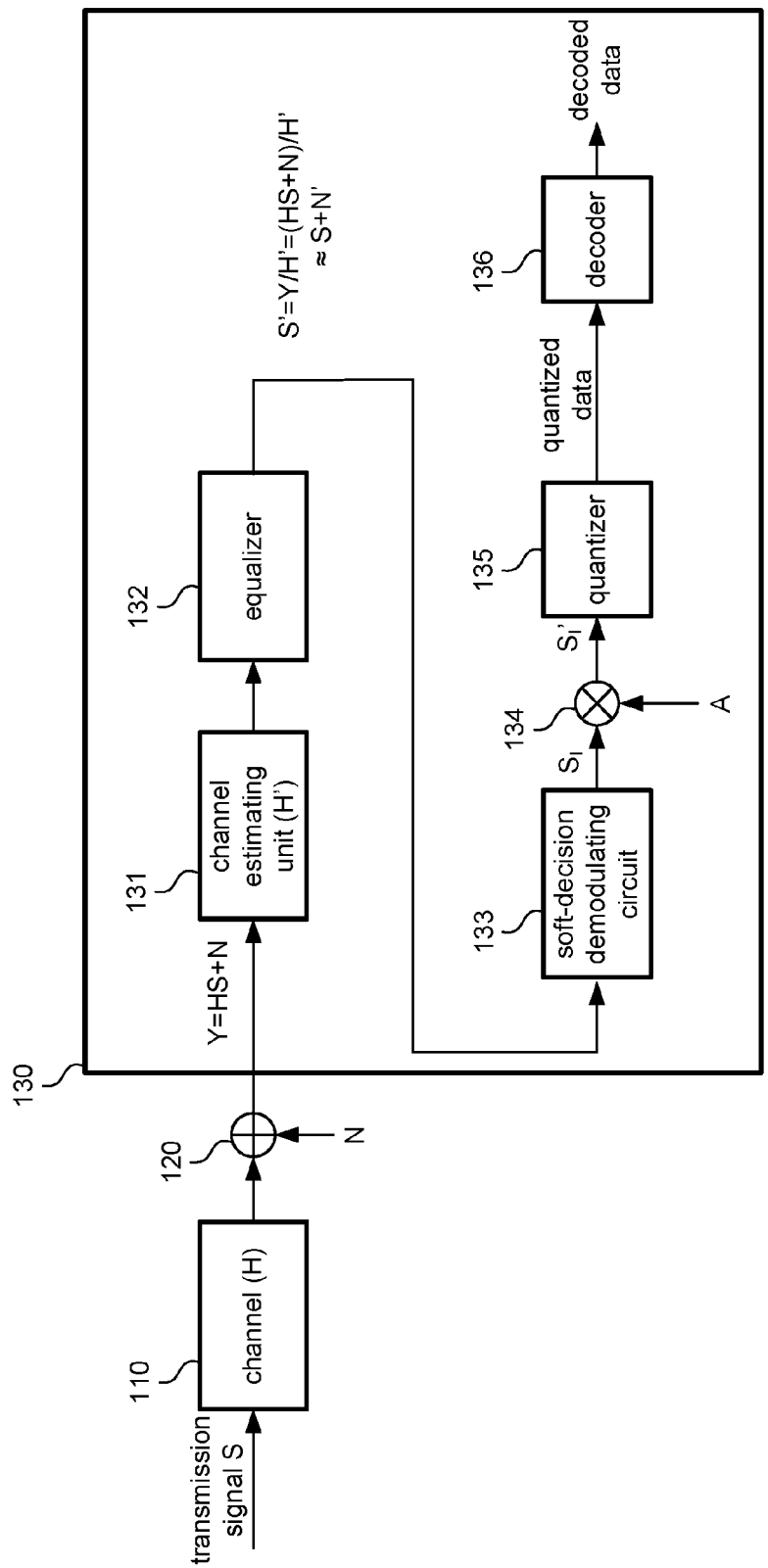
FIG. 1 is a functional block diagram of a signal receiving end of a conventional communication system.
Figure 2:
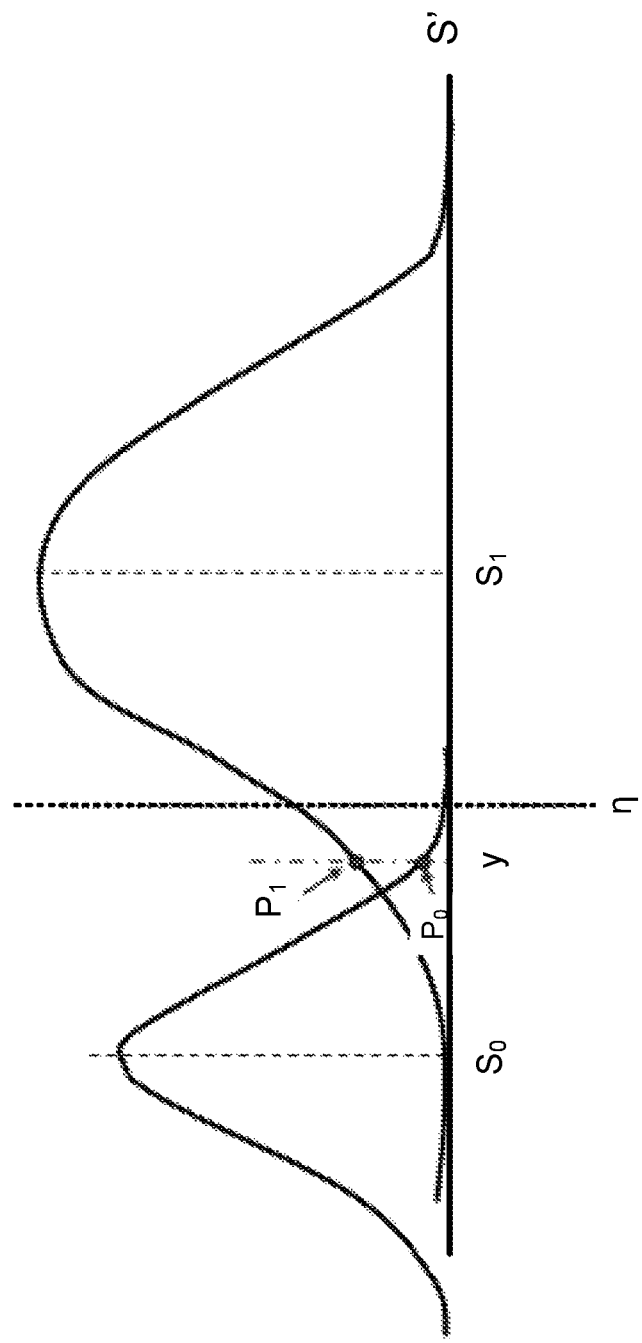
FIG. 2 is a relationship diagram of soft information and hard information.
Figure 3:
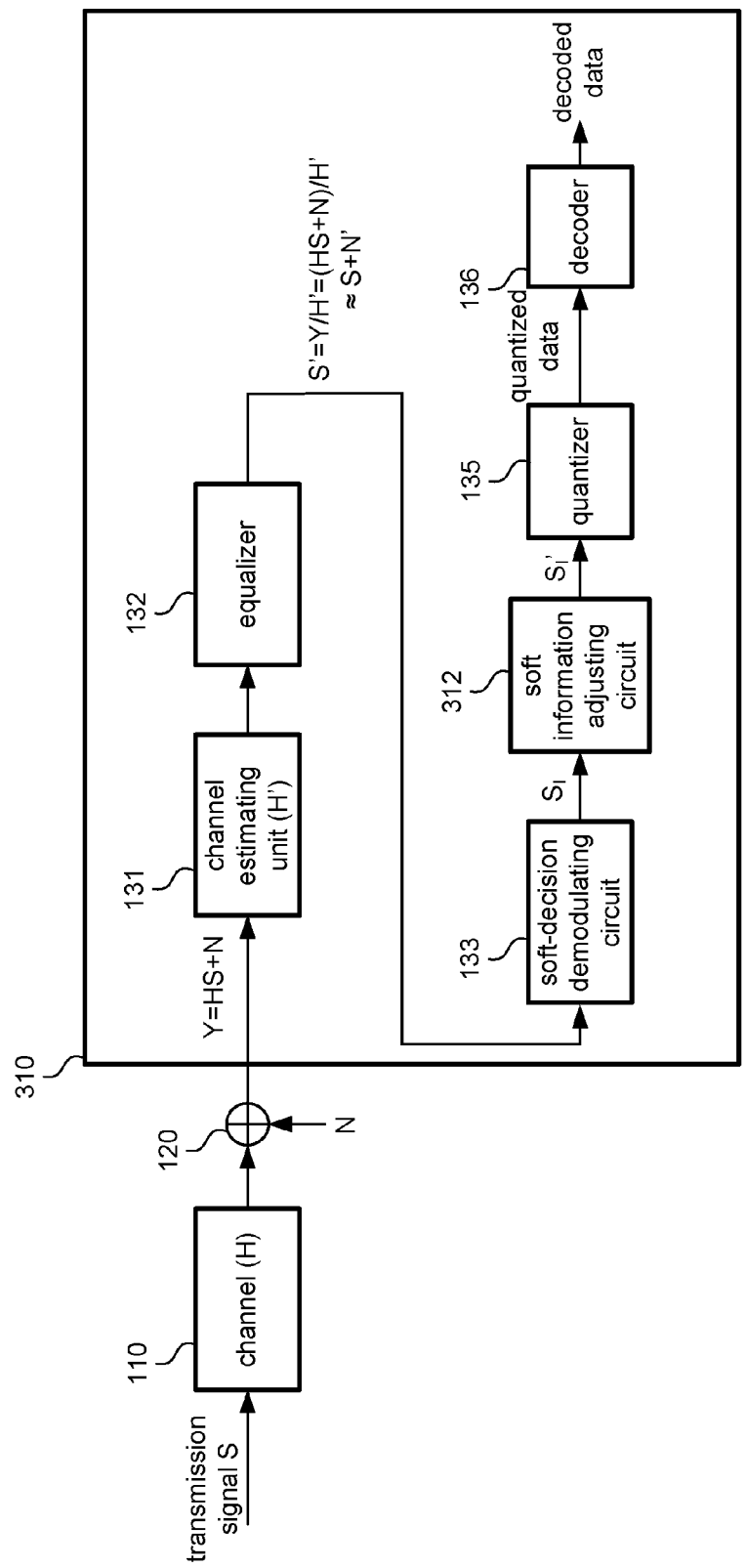
FIG. 3 is a functional block diagram of a signal receiver of a communication system according to an embodiment of the present invention.

FIG. 3 shows a functional block diagram of a signal receiver of a communication system according to an embodiment of the present invention. For example but not limited to, a signal receiver 310 of the present invention comprises a channel estimating unit 131, an equalizer 132, a soft decision demodulating circuit 133, a soft information adjusting circuit 312, a quantizer 135 and a decoder 136. The functional block diagram in FIG. 3 only depicts elements directly associated with the present invention. Depending on actual conditions, the signal receiver 310 of the present invention may include other elements, e.g., a de-interleaving circuit and a frequency down-converting circuit. Elements with the same names and denotations in the signal receiver 310 as the signal receiving end 130 in FIG. 1 have identical functions, and shall be omitted herein. The soft information adjusting circuit 312 of the present invention is capable of adjusting the soft information according to the distribution of the soft information, such that the adjusted soft information can be more appropriately quantized by the quantizer 135, in a way that the decoded data that the decoder 136 generates has a lower bit error rate (BER).

Figure 4:
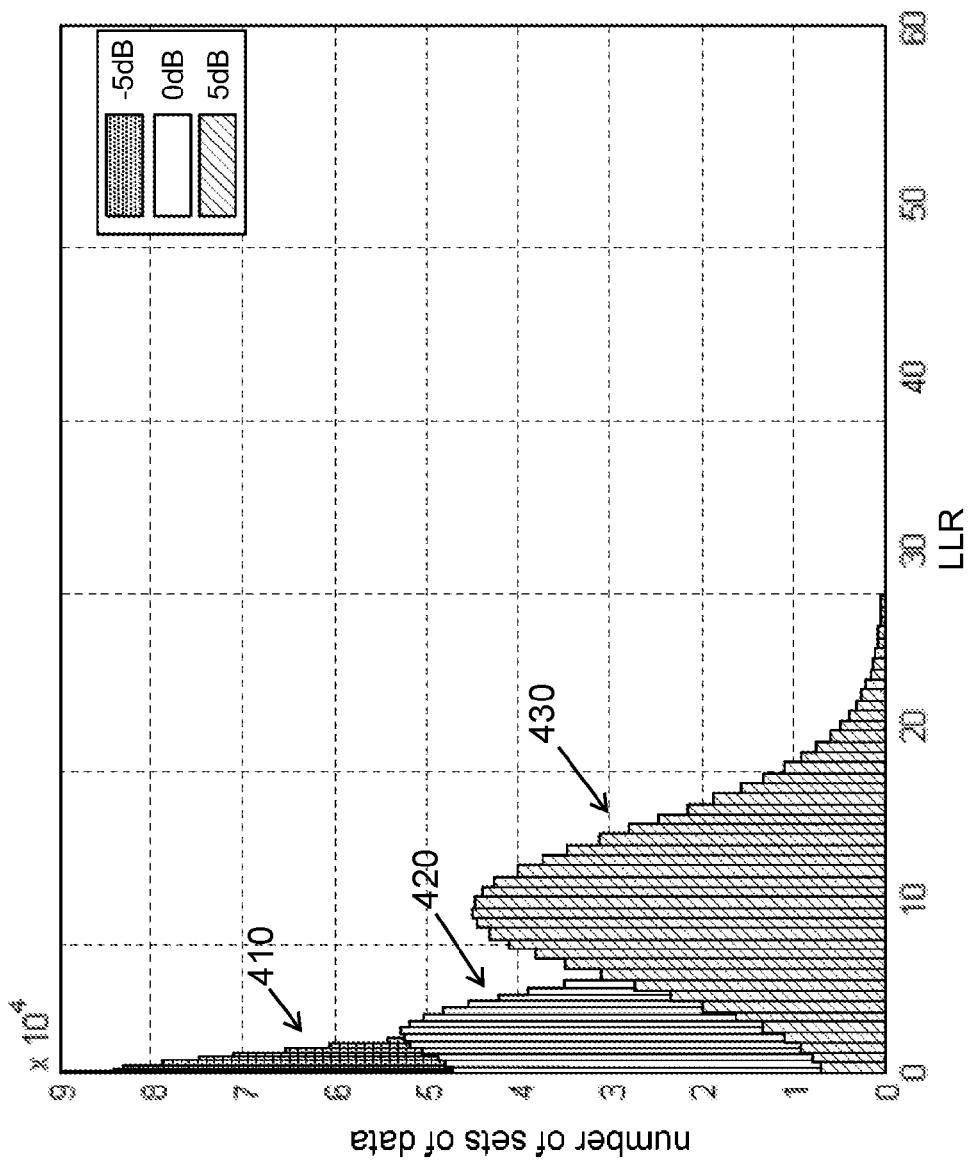
FIG. 4 is a schematic diagram of a distribution of soft information.

FIG. 4 shows a schematic diagram of a distribution of soft information. One packet is usually utilized as a unit of transmission at a transmitting end when data is transmitted, and one packet is correspondingly utilized as a unit for processing at a receiver when signal processing is performed. In FIG. 4, the vertical axis represents the number of sets of data, and the horizontal axis represents soft information, which is also referred to log likelihood ratio (LLR). The LLR is obtained from a maximum a posterior (MAP) probability, which is mathematically represented as equation (1):

$$LLR(S) = \ln\frac{P(S \mid S = S_1)}{P(S \mid S = S_0)} \quad (1)$$

When $P(S|S=S_1)>P(S|S=S_0)$ (meaning that the probability of determining the signal S as $S_1$ is greater than the probability of determining the signal S as $S_0$), $LLR(S)>0$; when $P(S|S=S_1)<P(S|S=S_0)$ (meaning that the probability of determining the signal S as $S_1$ is smaller than the probability of determining the signal S as $S_0$), $LLR(S)<0$. The diagram of soft information distribution in FIG. 4 includes three distribution patterns 410, 420 and 430, which respectively correspond to signal-to-noise ratios (SNRs) −5 dB, 0 dB and 5 dB. Each of the distribution patterns corresponds to one packet, and the number of sets of data of an LLR value is represented by a plurality of bars. In the embodiment, one packet has 100,000 sets of data, and FIG. 4 depicts the absolute value of the soft information. It is seen from the diagram that, as the SNR gets larger, the distribution of soft information of one packet also gets broader, i.e., the range of distribution pattern gets wider. The width distribution pattern affects the quantization result of the quantizer 135. If the distribution is too wide, the maximum (or minimum) value of soft information exceeds the upper limit (or the lower limit) of the quantization range of the quantizer 135. For example, assuming that the distribution range of soft information is −10 to +10 and the quantization range is −8 to +7, soft information smaller than −8 and greater than +7 is quantized into the same quantized data, leading to a reduced quantization resolution. On the other hand, if the distribution is too narrow, the distribution of soft information is concentrated at a small section of the quantization range. Assuming that the quantization range is −8 to +7 and the distribution range of soft information is −3 to +2, the accuracy of quantized data is reduced. Therefore, the present invention discloses the soft information adjusting circuit 312 that is capable of dynamically adjusting the soft information according to the actual distribution of the soft information.

Figure 5:
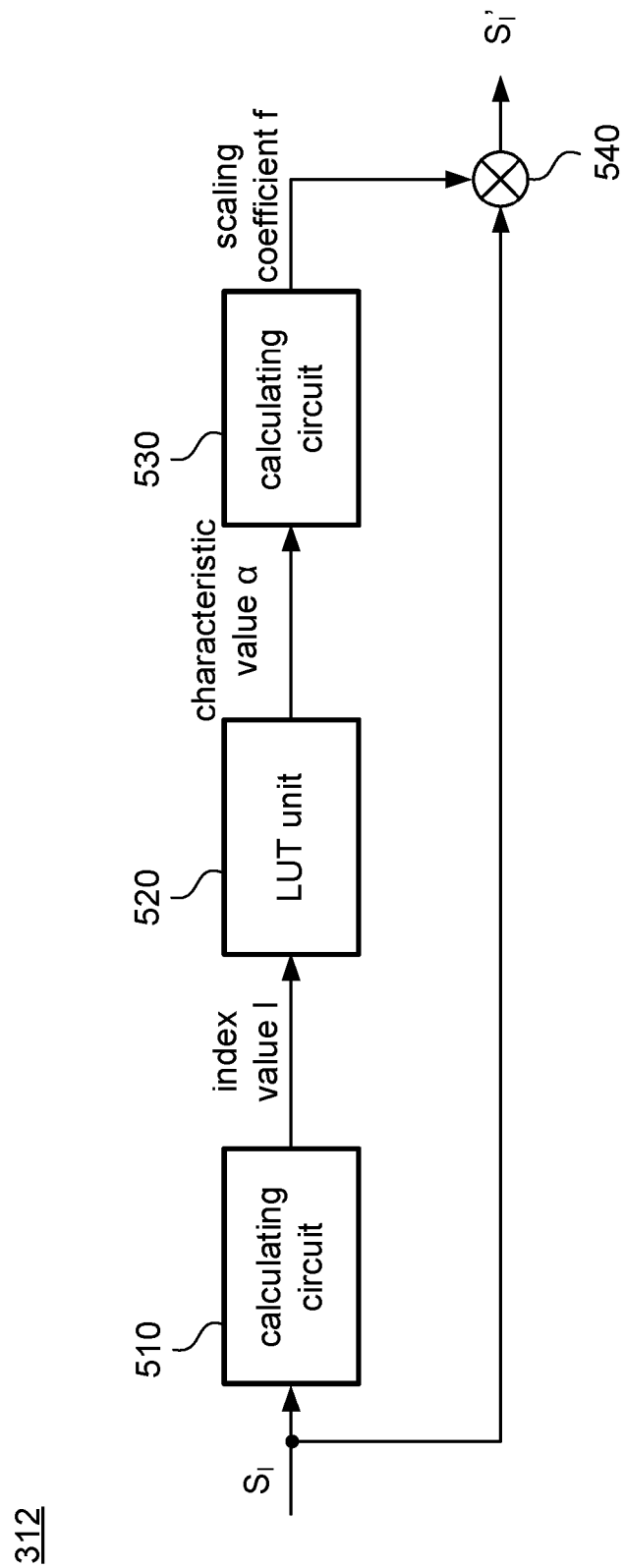
FIG. 5 is a functional block diagram of a soft information adjusting circuit according to an embodiment of the present invention.

FIG. 5 shows a functional block diagram of the soft information adjusting circuit 312 according to an embodiment of the present invention. The soft information adjusting circuit 312 includes a calculating circuit 510, a look-up table (LUT) unit 520 and a calculating circuit 530. The calculating circuit 510 is coupled to the soft decision demodulating circuit 133, and calculates an index value I according to the distribution of the soft information $S_I$. More specifically, the calculating circuit 510 calculates the index I according to equation (2):

$$I = \frac{Var[|S_I|]}{(E[|S_I|])^2} \tag{2}$$

Figure 6:
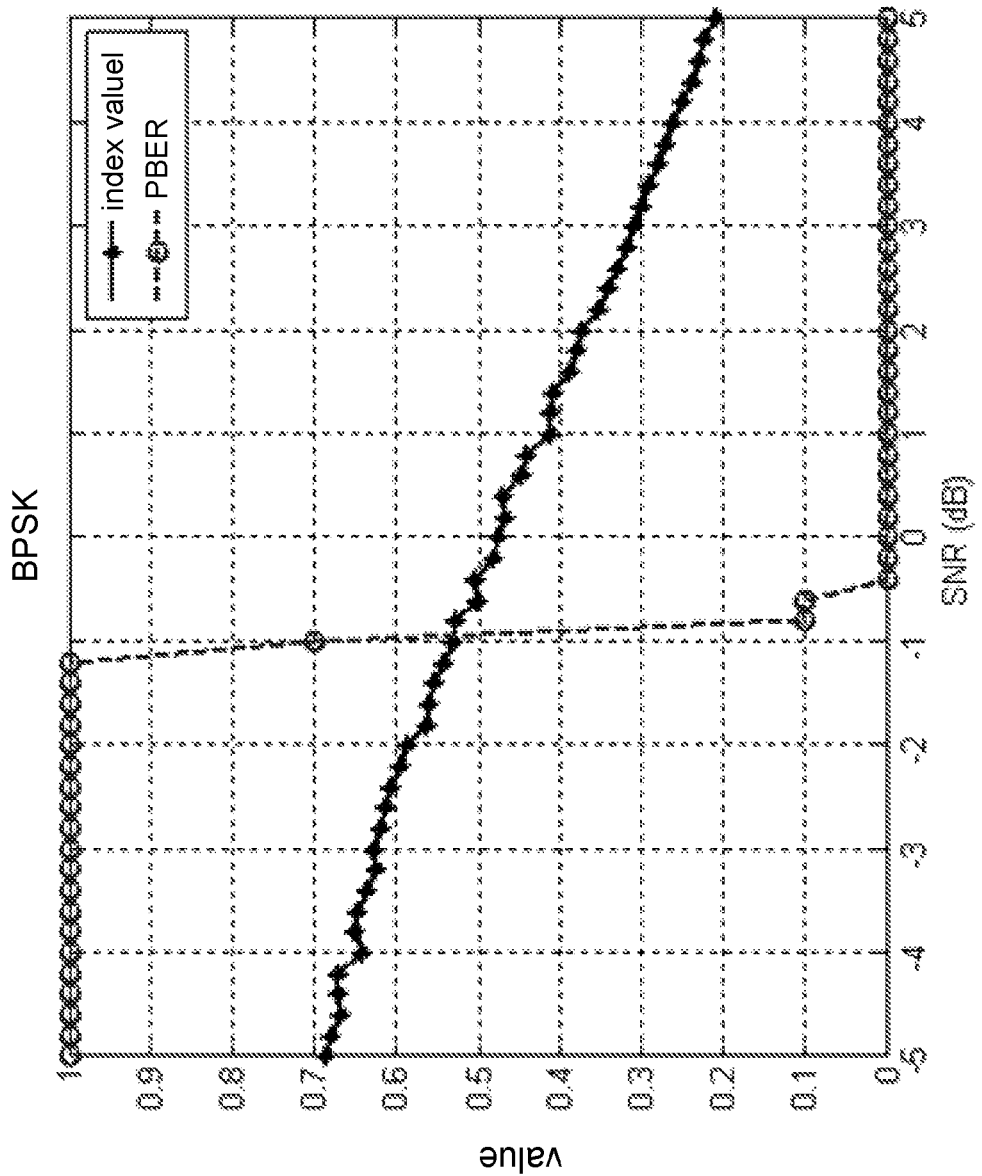
FIG. 6 is a relationship diagram of an index I, a packet BER and a signal-to-noise ratio (SNR) for a modulated signal based on binary phase shift keying (BPSK) modulation.
Figure 7:
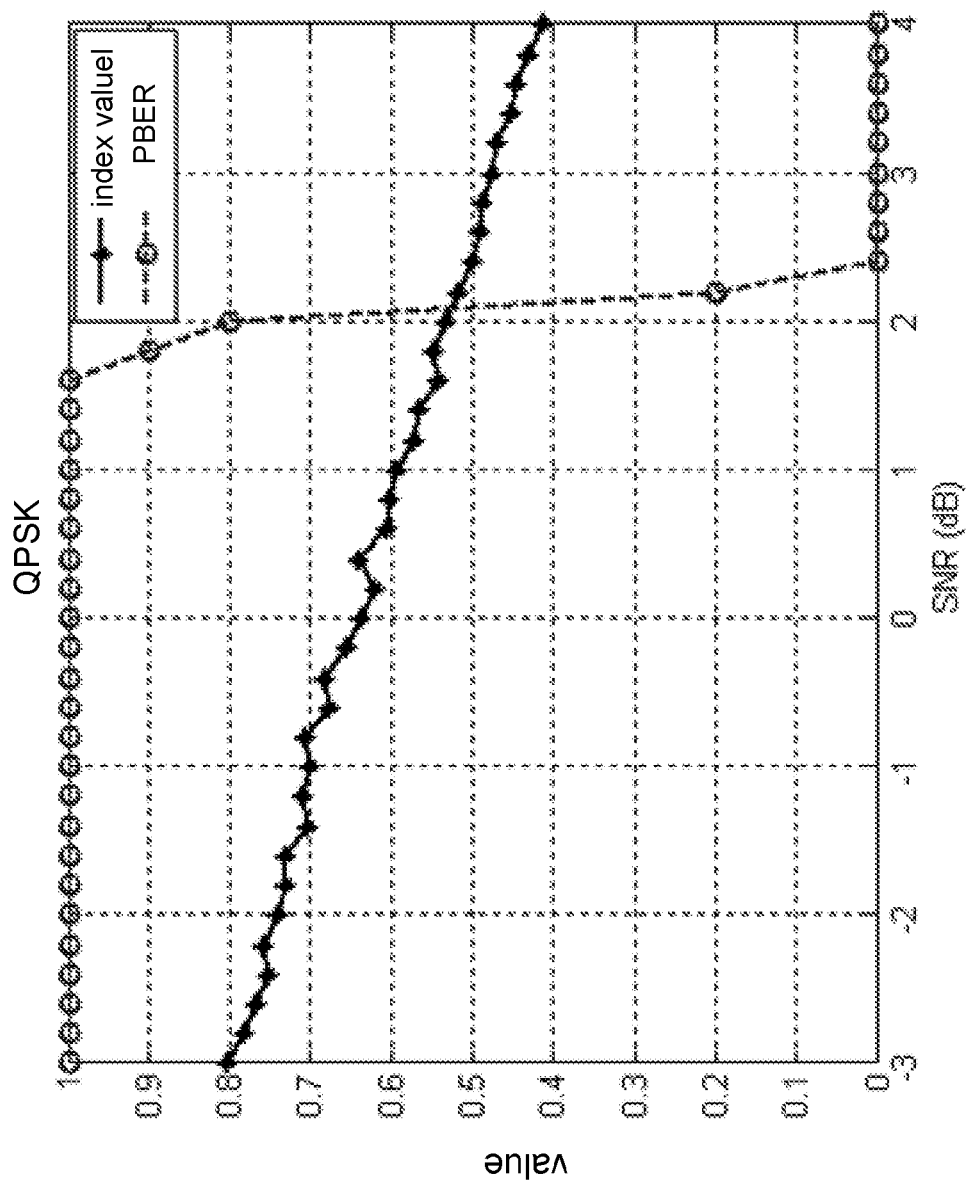
FIG. 7 is a relationship diagram of an index I, a packet BER and an SNR for a modulated signal based on quadrature phase shift keying (QPSK) modulation.

In equation (2), $E[|S_I|]$ represents an average of absolute values of the soft information $S_I$, $Var[|S_I|]$ is a variance of absolute values of the soft information $S_I$. In fact, $Var[|S_I|]$ $=E[(S_I-E[|S_I|])^2]$. Thus, the index value I may reflect the distribution of the soft information $S_I$, and is associated with a center (i.e., $E[|S_I|]$) of the distribution pattern and the width of the distribution range. FIG. 6 shows a relationship diagram of an index I, a packet bit error rate (PBER) and a signal-to-noise ratio (SNR) for a modulated signal based on binary phase shift keying (BPSK) modulation. The PBER is the ratio of the number of packets with erroneous data to the total number of packets. When any set of data in the data packet contains an error, the packet is regarded as a packet with erroneous data. Only when all data in a packet is correct, the packet is regarded as a packet with correct data. Thus, the accuracy of data is 100% when the PBER is 0, and is extremely poor when the PBER is 1. It is discovered from the diagram that, under the BPSK modulation mechanism, the index I decreases as the SNR increases, and the PBER is 0 when the SNR is high (e.g., SNR>−0.5 dB in this embodiment) and is 1 when the SNR is low (e.g., SNR<−1.2 dB in this embodiment). In this embodiment, the original soft information $S_I$ is good enough when PBER is 0 and need no further adjustment. Therefore, the present invention adjusts the soft information $S_I$ only when the PBER is not 0 (e.g., SNR<−0.5 dB in this embodiment). However, when the PBER is 1, not only the original soft information $S_I$ is unsatisfactory, but also the BER is too high such that a result after the adjustment may be ineffective. Thus, in practice, the present invention focuses on situations where the PBER is between 0.1 and 0.9, i.e., the soft information $S_I$ is adjusted when the SNR is between −0.6 dB and −1.0 dB. In this embodiment, the index I corresponding to an SNR between −0.6 dB and 1.0 dB is approximately between 0.5124 and 0.534. FIG. 7 shows a relationship diagram of the index I, the PBER and the SNR when a modulated signal is based on quadrature phase shift keying (QPSK) modulation. It is discovered from the diagram that, under the QPSK modulation mechanism, the index I decreases as the SNR increases, and the PBER is 0 when the SNR is high (SNR>2.3 dB in this embodiment) and is 1 when the SNR is low (SNR<1.7 dB in this embodiment). Similarly, in this embodiment, the present invention also focuses on situations where the PBER is between 0.1 and 0.9, i.e., soft information $S_I$ is adjusted when the SNR is between 1.9 dB and 2.3 dB. In this embodiment, the index value I corresponding to an SNR between 1.9 dB and 2.3 dB is approximately between 0.5339 and 0.5106.

Figure 8:
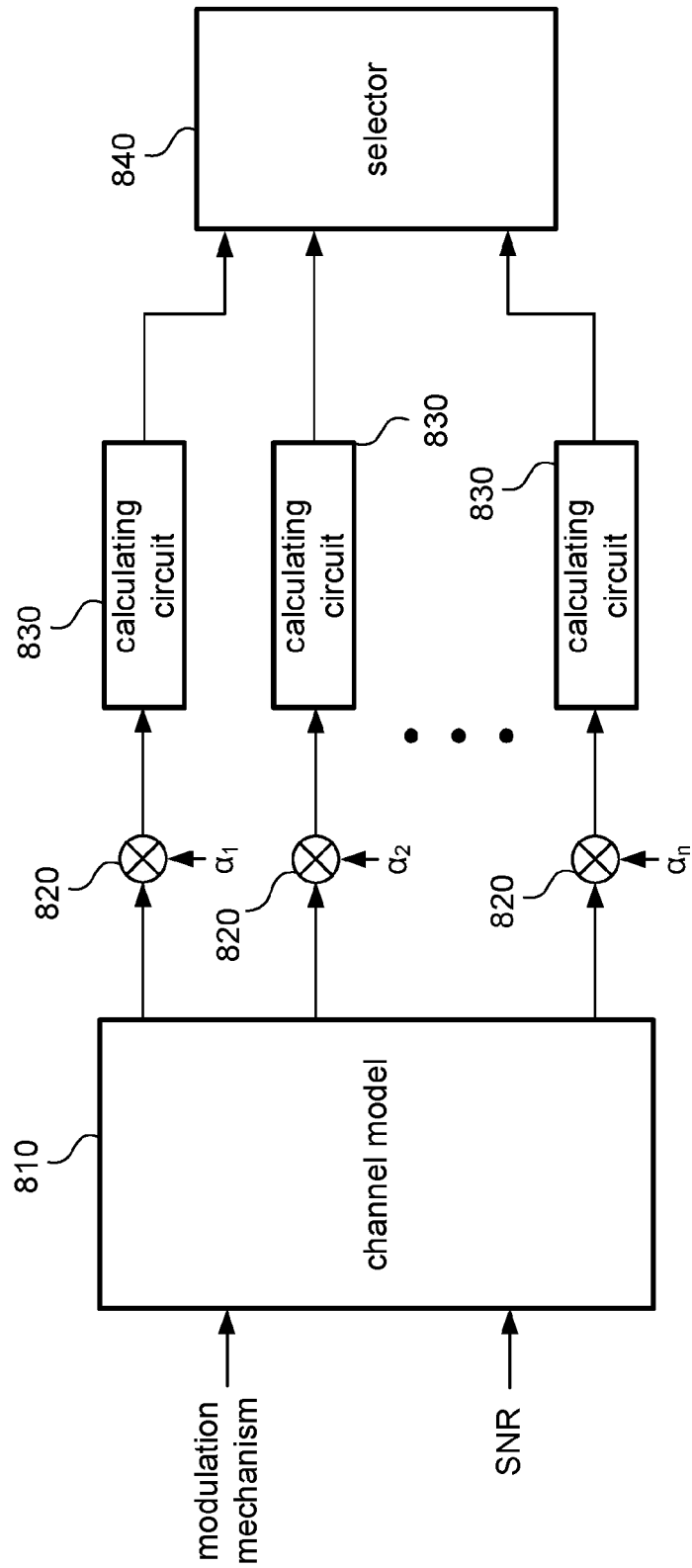
FIG. 8 is a circuit diagram for establishing an LUT according to an embodiment of the present invention.

Referring to FIG. 5, after the calculating circuit 510 calculates the index value I, the LUT unit 520 looks up an LUT according to the index value I to obtain a characteristic value α. The LUT may be stored in the LUT unit 520 or may be exist independently in a storage space (not shown) outside the LUT unit 520. The LUT is established in advance through experimental tests or simulation according to different channel and modulation mechanisms. FIG. 8 shows a circuit diagram of establishing an LUT according to an embodiment of the present invention. The type of a channel model 810 is first determined, for example but not limited to, a fading channel (or referred to as a multipath fading channel) or a flat channel, and the modulation mechanism is then determined, for example but not limited to, BPSK, QPSK, 16QAM or 64QAM. Having determined the channel type and the modulation mechanism, soft information corresponding to different SNRs may be generated through changing the SNR. The soft information is multiplied by different characteristic values ($\alpha_1$, $\alpha_2$, $\alpha_3$ . . . $\alpha_n$) by a plurality of multipliers 820, respective PBERs are calculated by a calculating circuit 830, and a smallest PBER is identified by a comparator 840. The characteristic value α corresponding to the smallest PBER is the optimal characteristic value of the SNR. With different types of the channel model 810, different modulation mechanisms and different SNRs, optimal characteristic values corresponding to different conditions can be estimated and stored to form the LUT. FIG. 9 shows an LUT corresponding to a BPSK modulation mechanism according to an embodiment of the present invention. As previously disclosed, under a BPSK modulation mechanism, the soft information is adjusted only when the SNR falls between −0.6 dB and −1.0 dB. Thus, when the LUT in FIG. 9 is established, the characteristic value is measured within the above range each time the SNR changes by 0.1 dB, and so a total of 5 characteristic values are obtained. However, the measurement interval of the SNR can be reduced to increase the precision of the LUT table. Having obtained the relationship between the SNR and the characteristic value α, the relationship between the SNR and the index value I may be further identified from FIG. 6. Thus, the LUT unit 520 may identify the corresponding characteristic value α only according to the index value I. Similarly, other modulation mechanisms also have different LUTs. FIG. 10 shows an LUT corresponding to a QPSK modulation mechanism according to an embodiment. As previously disclosed, under a QPSK modulation mechanism, the soft information is adjusted only when the SNR falls between 1.9 dB and 2.3 dB, and so the LUT is established for only the parts of the SNR ranging between 1.9 dB and 2.3 dB under a QPSK modulation mechanism. FIG. 11 shows an LUT corresponding to a 64QAM modulation mechanism according to an embodiment of the present invention. It should be noted that, establishing the LUT in advance may increase the efficiency of the looking-up process as well as simplifying the circuit design. However, the circuit in FIG. 8 may also be integrated in the soft information adjusting circuit 312, so as to in real-time simulate according to requirements and provide the LUT that the LUT unit 520 needs.

Again referring to FIG. 5, after the characteristic value α is obtained by the LUT unit 520, the calculating circuit 530 computes the characteristic value α according to the soft information $S_I$ to obtain a scaling coefficient f. The scaling coefficient f is a result of dividing the characteristic value α by an average of absolute values of the soft information $S_I$, and may be represented by equation (3):

$$f = \frac{\alpha}{E[|S_I|]} \tag{3}$$

When the calculating circuit 530 processes the equation (3), it may obtain E[|SI|] by computing the soft information $S_I$ or directly obtain E[|SI|] generated by the calculating circuit 510. The multiplier 540 then multiplies the soft information $S_I$ by the scaling coefficient f to obtain the adjusted soft information $S_1'$. The soft information adjusting circuit 312 outputs the adjusted soft information $S_I'$ to the quantizer 135. Taking an actual QPSK example for instance, for Var[|$S_I$|]=8.6087 and E[|$S_I$|]=4.0703 of the distribution pattern of the soft information $S_I$, the index value I=0.5196 is obtained according to equation (2). According to the LUT in FIG. 10, as the index value I=0.5196 is smaller than 0.5227, 4.7234 is chosen as the characteristic value α, and the scaling coefficient f=4.7234/4.0703=1.1695 is obtained according to equation (3).

Figure 12:
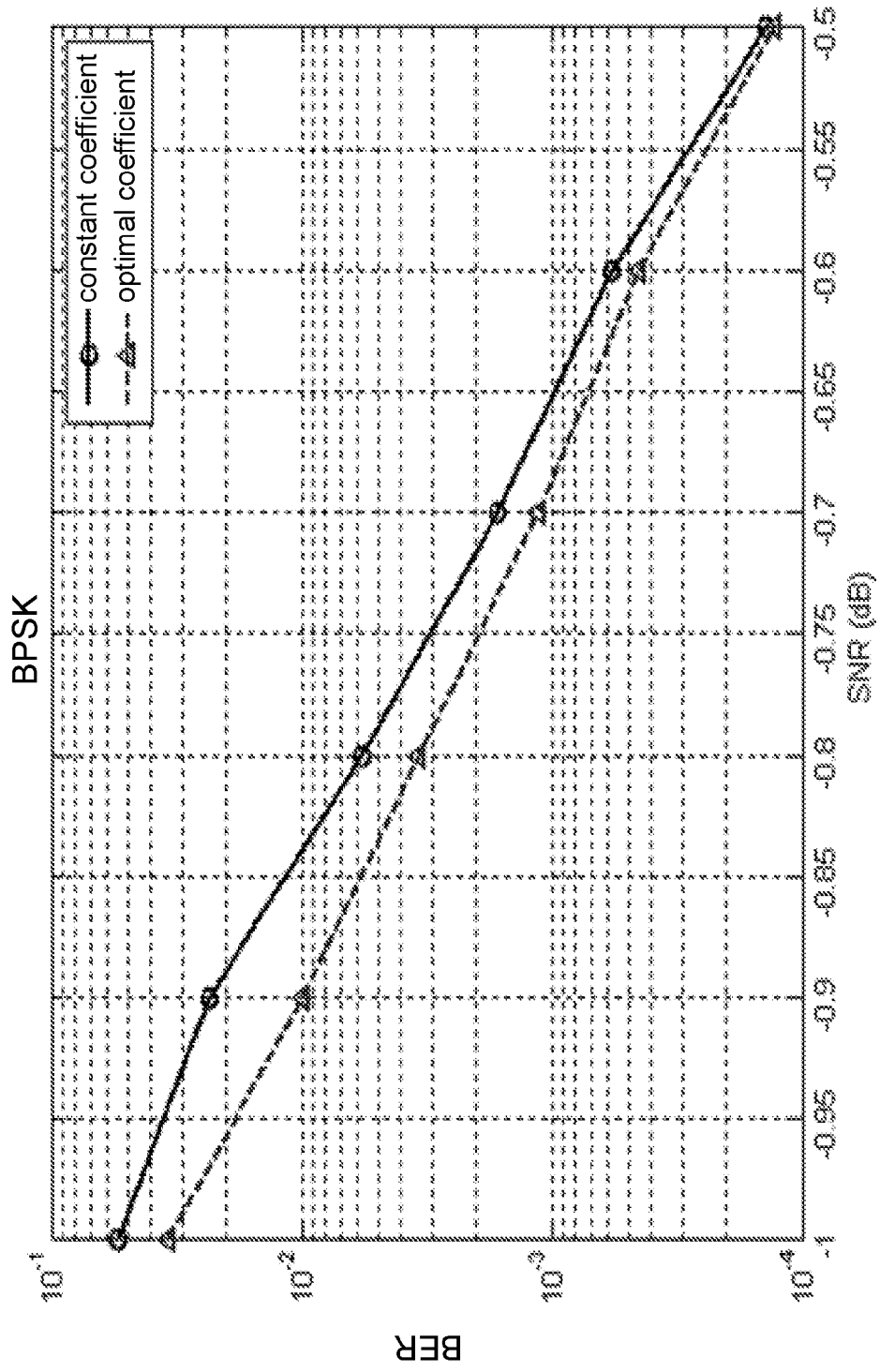
FIG. 12 is a relationship diagram of a BER and an SNR when applying a conventional constant coefficient and applying an optimal coefficient of the present invention in a BPSK modulation mechanism.
Figure 13:
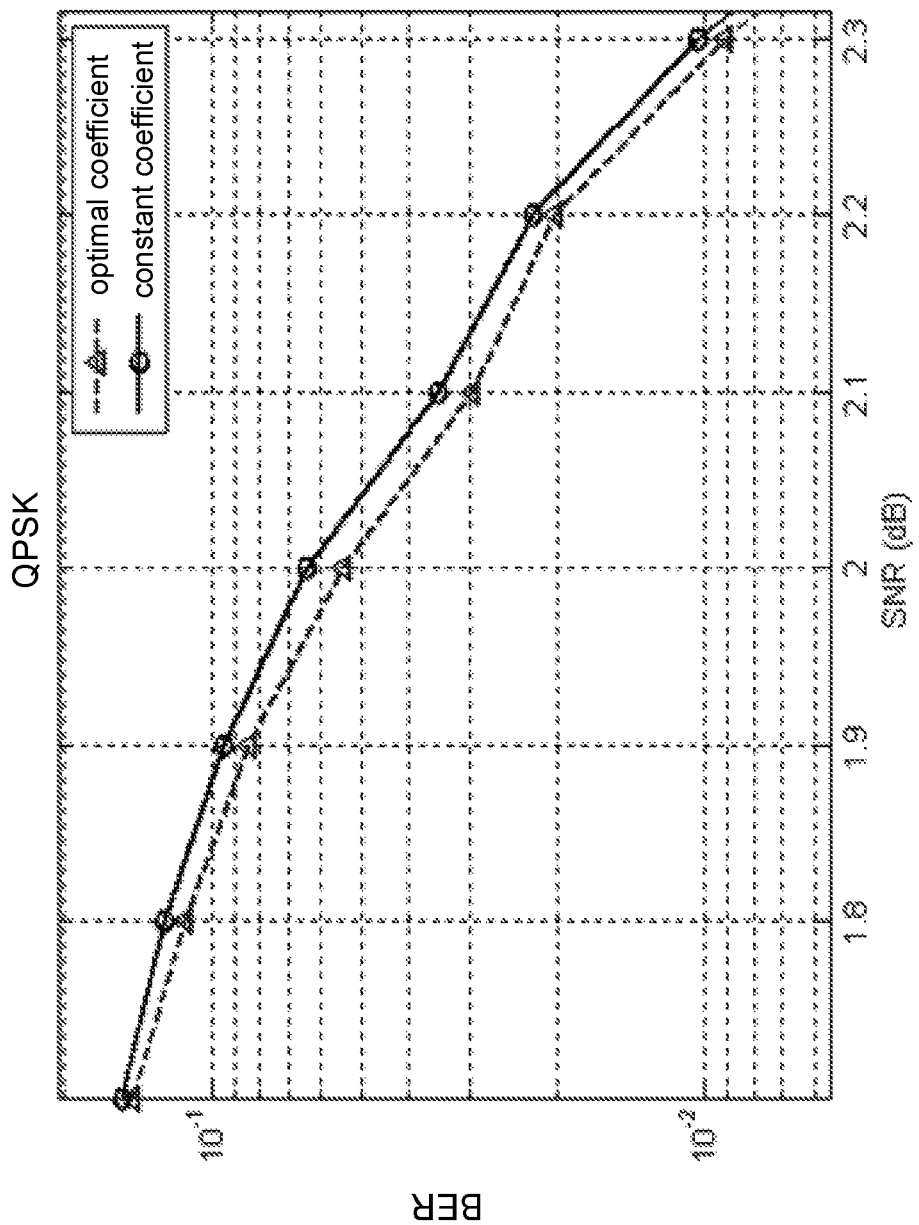
FIG. 13 is a relationship diagram of a BER and an SNR when applying a conventional constant coefficient and applying an optimal coefficient of the present invention in a QPSK modulation mechanism.
Figure 14:
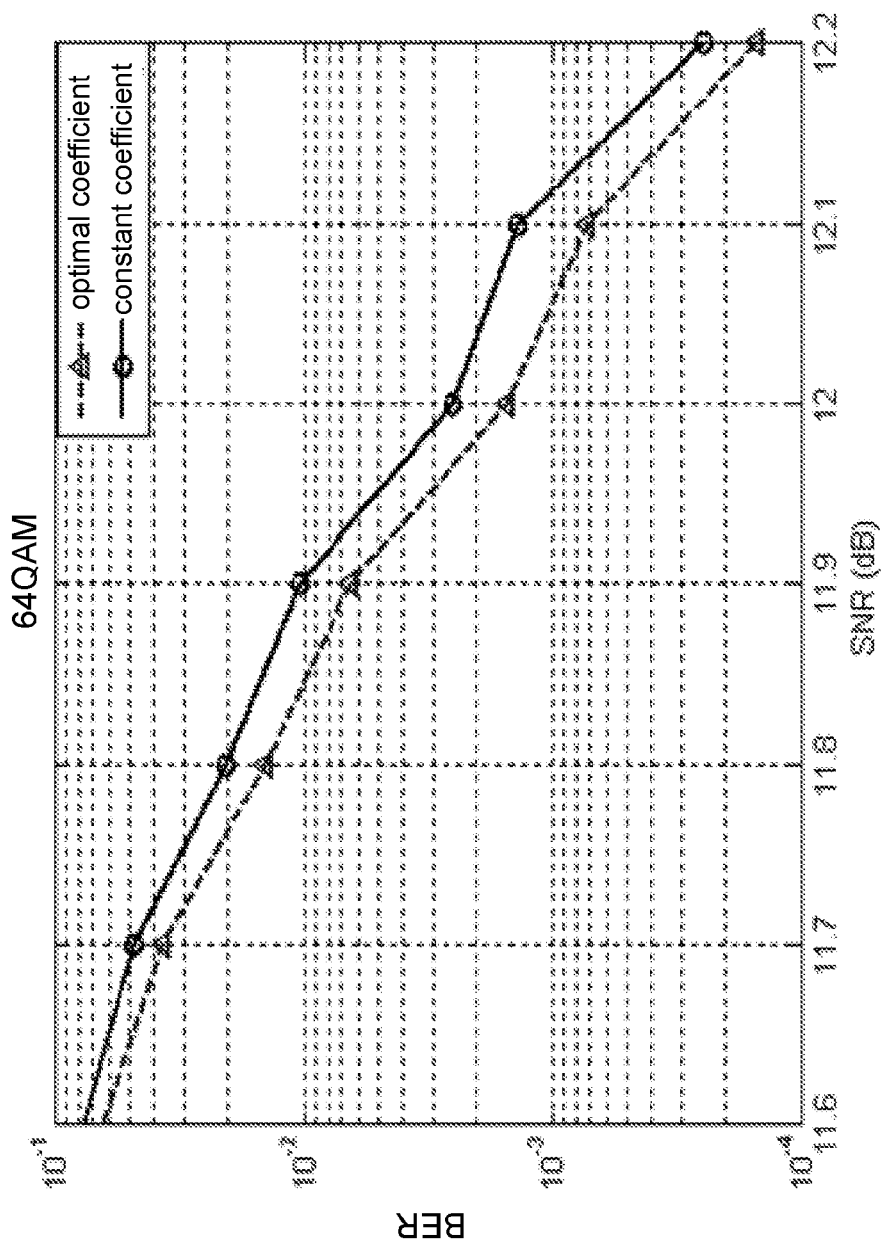
FIG. 14 is a relationship diagram of a BER and an SNR when applying a conventional constant coefficient and applying an optimal coefficient of the present invention in a 64QAM modulation mechanism.

FIG. 12 shows a relationship diagram of a BER and an SNR when applying a conventional constant coefficient and applying an optimal coefficient of the present invention (i.e., the scaling coefficient f obtained according to the distribution of the soft information $S_I$) in a BPSK modulation mechanism. It is discovered that, in the adjustment range of the soft information adjusting circuit 312, the adjusting mechanism of the present invention effectively reduces the BER of the data. For the BPSK modulation mechanism, in average, the present invention improves by about 0.07 dB compared to the conventional method. FIG. 13 and FIG. 14 are relationship diagrams of a BER and an SNR when applying a conventional constant coefficient and applying an optimal coefficient of the present invention in QPSM and 64QAM modulation mechanisms, respectively. Similarly, within the adjustment range of the soft information adjusting circuit 312, the present invention effectively reduces the BER.

Figure 15:
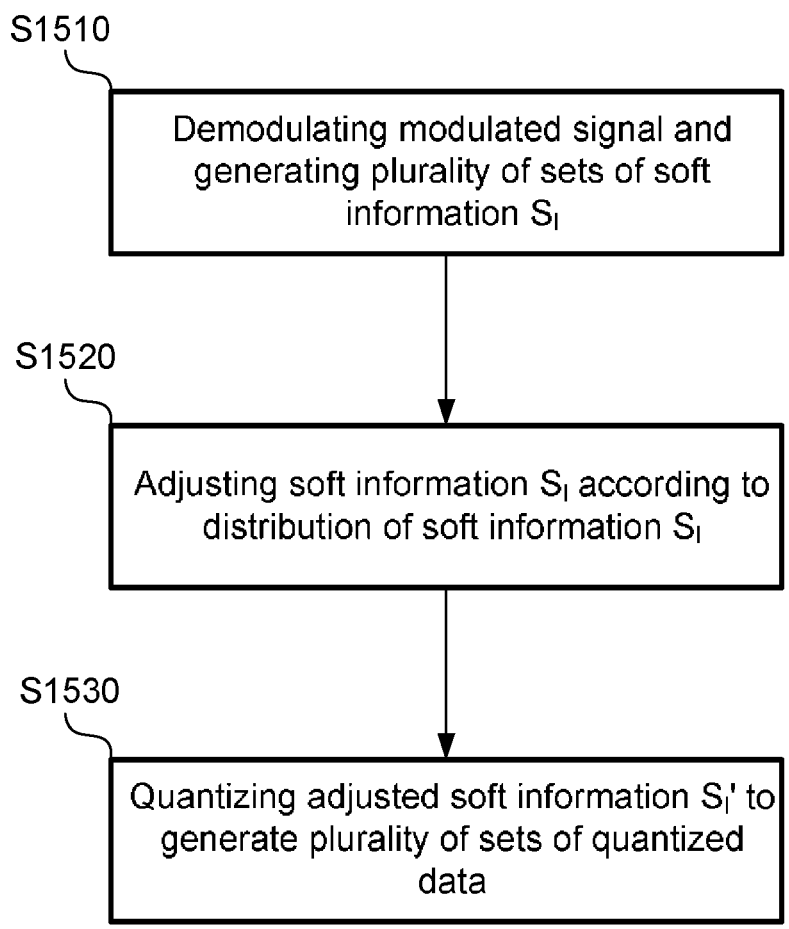
FIG. 15 is a flowchart of a signal processing method according to an embodiment of the present invention.

FIG. 15 shows a flowchart of a signal processing method according to an embodiment of the present invention. In addition to the foregoing signal receiver of a communication system, the present invention correspondingly discloses a signal processing method applied to a signal receiver of a communication system. The signal processing method is capable of dynamic adjustment according to the distribution of the soft information $S_I$ to better adapt to a predetermined quantization range of a subsequent quantization process, and is performed by the signal receiver 310 or an equivalent device. As shown in FIG. 15, the signal processing method according to an embodiment of the present invention includes following steps.

In step S1510, a modulated signal is demodulated to generate a plurality of sets of soft information $S_I$. A signal that a signal receiver of a communication system receives is usually a modulated signal. In this step, the modulated signal is demodulated using a demodulation method based on soft decision. A plurality of sets of soft information $S_I$ is obtained after the demodulation.

In step S1520, the soft information $S_I$ is dynamically adjusted according to the distribution of the soft information $S_I$. The soft information $S_I$ generated in step S1510 may be non-ideal as having been affected by channels and noise, such that the BER may be too high and data of the entire packet may be erroneous. To reduce the BER, the present invention dynamically adjusts the soft information $S_I$ according to the distribution of the soft information $S_I$ instead of using a constant coefficient. Thus, the soft information $S_I$ is dynamically adjusted according to environmental conditions (which affect the distribution of the soft information $S_I$) such as the channels and noise that a signal actually undergoes. Thus, the adjusted soft information $S_I'$ better satisfies the predetermined quantization of a subsequent quantization step to further reduce the BER.

In step S1530, the adjusted soft information $S_I'$ is quantized to generate a plurality of sets of quantized data. The adjusted soft information $S_I'$ generated in the previous step already better satisfies the quantization range of this step, and therefore this step is allowed to obtain more accurate quantized data that helps a subsequent decoding step (not shown) to decode and obtain decoded data with an even lower BER.

Figure 16:
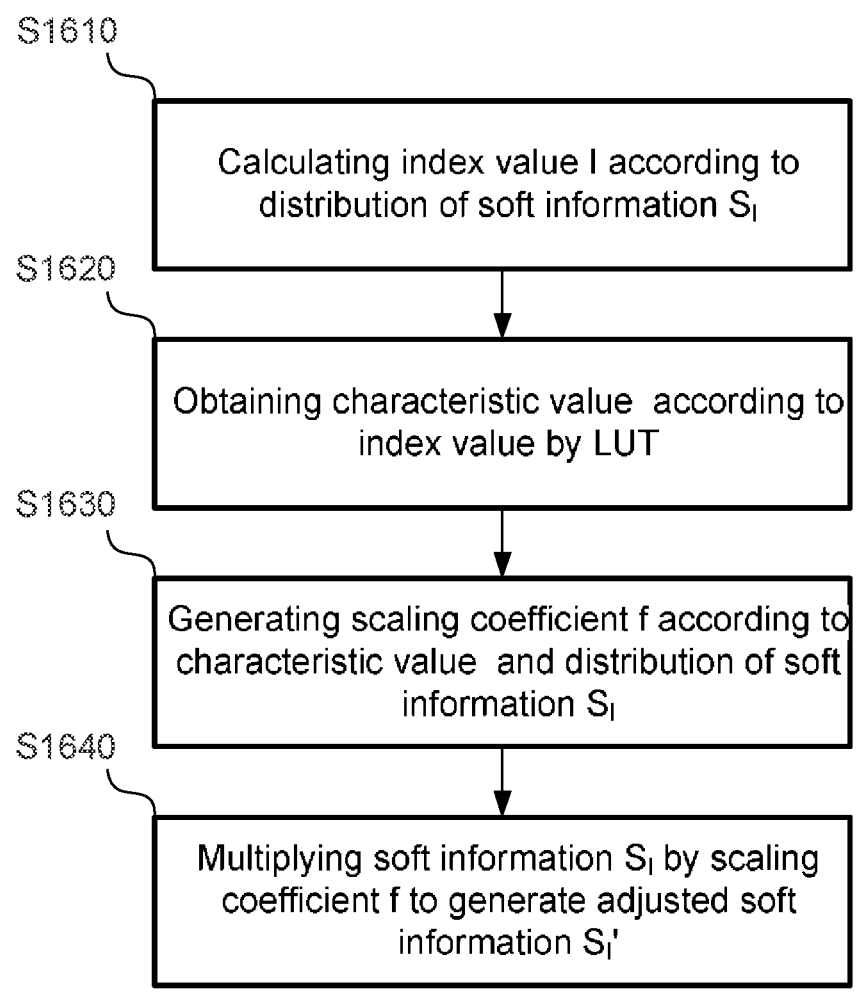
FIG. 16 is a detailed flowchart of dynamically adjusting soft information according to a distribution of the soft information according to an embodiment of the present invention.

It should be noted that, the above steps describe only parts most associated with the present invention. In general, a signal processing method of a signal receiver of a communication system may include other steps, such as the channel estimation step performed by the channel estimating unit 131 in FIG. 3, and the quantization step performed by the equalizer 132, or other de-interleaving steps. Further, step S1520 further includes detailed sub-steps. FIG. 16 shows a detailed flowchart of adjusting soft information according to a distribution of the soft information according to an embodiment of the present invention, with details of the steps given as below.

In step S1610, an index value I is calculated according to the distribution of the soft information $S_I$. The distribution of soft information of one packet is as shown in FIG. 4, with the distribution pattern varying for different SNRs. The width of the distribution pattern affects the quantization result, and thus the index value I is generated according to the distribution of the soft information $S_I$ in this step. That is to say, the index value I reflects the distribution of the soft information $S_I$. The relationship between the index value I and the soft information $S_I$ is as represented by equation (2).

In step S1620, a characteristic value α is obtained according to the index value I through an LUT method. An LUT is established according to the characteristic values α corresponding to different SNR values, and different LUTs are obtained for different channel models and signal modulation mechanisms. Details for establishing the LUT are disclosed in FIG. 8 and the associated description, and shall be omitted herein. As shown in FIG. 6 and FIG. 7, under different modulation mechanisms, predetermined relationships are present between the index value I and the SNR. Thus, through an LUT, the characteristic value α can be identified using the index value I, i.e., the characteristic value α is obtained according to the distribution of the soft information $S_I$.

In step S1630, the scaling coefficient f is generated according to the characteristic value α and the distribution of the soft information $S_I$. The scaling coefficient f may be obtained according to equation (3), i.e., the scaling coefficient f is a result of dividing the characteristic value α by an average of absolute values of the soft information $S_I$.

In step S1640, the soft information $S_I$ is multiplied by the scaling coefficient f to generate the adjusted soft information $S_I'$. The adjusted soft information $S_I'$ better adapts to the distribution range of the quantization process and further helps reducing the BER of the decoded data.

In conclusion, the present invention in real-time adjusts the soft information according to the distribution of the soft information, such that adaptive adjustment can be made according to actual conditions of the soft information instead of using a constant coefficient. Thus, the adjusted soft information better satisfies a predetermined quantization range of a subsequent quantization process to further reduce the BER.

One person skilled in the art can understand details and variations of the method of the present invention in FIG. 15 and FIG. 16 according to the disclosure of the device in FIG. 3 and FIG. 5. Further, QAM is taken as an example in the embodiments and is not to be construed as a limitation to the present invention. One person skilled in the art can appropriately apply the present invention to other types of modulation techniques based on the disclosure of the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal receiver of a communication system, receiving a modulated signal comprising a plurality of packets, the signal receiver comprising:
   a demodulating circuit, configured to demodulate the modulated signal to generate a plurality of sets of soft information corresponding to each packet;
   a soft information adjusting circuit, coupled to the demodulating circuit, configured to adjust the sets of soft information according to a distribution of the sets of soft information corresponding to each packet;
   a quantizer, coupled to the soft information adjusting circuit, configured to quantize the sets of adjusted soft information to generate a plurality of sets of data;
   a decoder, coupled to the quantizer, configured to decode the sets of data,
   wherein the distribution of the sets of soft information is a corresponding relationship between the soft information and the number of the sets of soft information under a signal-to-noise ratio (SNR); and
   a look-up table (LUT);
   wherein the soft information adjusting circuit looks up the LUT according to the distribution of the sets of soft information to generate a scaling coefficient, and adjusts the sets of soft information according to the scaling coefficient to generate the adjusted sets of soft information, and
   wherein the soft information adjusting circuit further comprises:
   a first calculating circuit, coupled to the demodulating circuit, configured to calculate an index value according to the distribution of the sets of soft information;
   an LUT unit, coupled to the first calculating circuit and the LUT, configured to look up the LUT according to the index value to obtain a characteristic value;
   a second calculating circuit, coupled to the LUT unit, configured to generate the scaling coefficient according to the characteristic value and the distribution of the sets of soft information; and
   a multiplying unit, coupled to the second calculating circuit and the demodulating circuit, configured to multiply the sets of soft information by the scaling coefficient to generate the adjusted sets of soft information.

2. The signal receiver according to claim 1, wherein the first calculating circuit divides a variance of absolute values of the sets of soft information by a square of an average of the absolute values of the sets of soft information to obtain the index value.

3. The signal receiver according to claim 1, wherein the second calculating circuit divides the characteristic value by an average of absolute values of the sets of soft information to obtain the scaling coefficient.

4. The signal receiver according to claim 1, wherein the LUT is established by identifying the characteristic value corresponding to a smallest BER according to a plurality of different SNRs under a channel model and a signal modulation mechanism.

5. The signal receiver according to claim 4, wherein a correlation is present between the index value and the SNRs, and the LUT further establishes a corresponding correlation between the index value and the characteristic value according to the correlation.

6. The signal receiver according to claim 1, wherein the modulated signal is a quadrature amplitude modulation (QAM) signal.

7. A signal processing method, applied to a signal receiver of a communication system, comprising:
   demodulating a modulated signal comprising a plurality of packets to generate a plurality of sets of soft information corresponding to each packet;
   adjusting the sets of soft information according to a distribution of the sets of soft information corresponding to each packet;
   quantizing the sets of adjusted soft information to generate a plurality of sets of data;
   decoding the sets of data,
   wherein the distribution of the sets of soft information is a corresponding relationship between the sets of soft information and the number of the sets of soft information under an SNR;
   wherein the step of adjusting the sets of soft information according to the distribution of the sets of soft information comprises:
   looking up an LUT according to the distribution of the sets of soft information to generate a scaling coefficient; and
   adjusting the sets of soft information according to the scaling coefficient to generate the adjusted sets of soft information,
   wherein the step of looking up the LUT according to the distribution of the sets of soft information to generate the scaling coefficient comprises:
   calculating an index value according to the distribution of the sets of soft information;
   looking up the LUT according to the index value to obtain a characteristic value; and
   generating the scaling coefficient according to the characteristic value and the sets of soft information.

8. The signal processing method according to claim 7, wherein the step of calculating the index value according to the distribution of the sets of soft information comprises dividing a variance of absolute values of the sets of soft information by a square of an average of the absolute values of the sets of soft information to obtain the index value.

9. The signal processing method according to claim 7, wherein the step of generating the scaling coefficient according to the characteristic value and the distribution of the sets of soft information comprises dividing the characteristic value by an average of absolute values of the sets of soft information to obtain the scaling coefficient.

10. The signal processing method according to claim 7, wherein the LUT is established by identifying the characteristic value corresponding to a smallest BER according to a plurality of different SNRs under a channel model and a signal modulation mechanism.

11. The signal processing method according to claim 10, wherein a correlation is present between the index value and the SNRs, and the LUT further establishes a corresponding correlation between the index value and the characteristic value according to the correlation.

12. The signal processing method according to claim 7, wherein the step of adjusting the sets of soft information according to the scaling coefficient to generate the adjusted sets of soft information comprises multiplying the sets of soft information by the scaling coefficient to generate the adjusted sets of soft information.

13. The signal processing method according to claim 7, wherein the modulated signal is a QAM signal.

* * * * *